United States Patent [19]

Fay

[11] 4,308,648

[45] Jan. 5, 1982

[54] CONVOLUTED HOSE CLAMPS

[75] Inventor: Robert F. Fay, York, Pa.

[73] Assignee: Murray Corporation, Cockeysville, Md.

[21] Appl. No.: 135,003

[22] Filed: Mar. 31, 1980

[51] Int. Cl.³ .................. B65D 63/02; F16L 33/00
[52] U.S. Cl. .................. 24/274 R; 24/279; 24/280; 24/20 R; 24/20 CW
[58] Field of Search .......... 24/274 R, 275, 279, 24/280, 274 WB, 20 R, 20 TT, 20 CW

[56] References Cited

U.S. PATENT DOCUMENTS

| | | | |
|---|---|---|---|
| 758,820 | 5/1904 | Chaplin | 24/20 CW |
| 931,706 | 8/1909 | Stevens | 24/20 CW |
| 1,173,998 | 2/1916 | Depew | 24/20 CW |
| 1,349,789 | 8/1920 | Schirra | 24/20 CW |
| 1,705,895 | 3/1929 | Blair | 24/20 CW |
| 2,867,883 | 1/1959 | Talmadge | 24/279 |
| 3,162,921 | 12/1964 | Cheris | 24/274 R |
| 3,189,961 | 6/1965 | Heller | 24/20 CW |
| 3,475,793 | 11/1969 | Oetiker | 24/20 CW |
| 3,477,106 | 11/1969 | Tetzlaff et al. | 24/279 |
| 3,869,944 | 3/1975 | Oetiker | 24/20 CW |

FOREIGN PATENT DOCUMENTS

| | | | |
|---|---|---|---|
| 1116743 | 5/1956 | France | 24/20 CW |
| 1264779 | 5/1961 | France | 24/274 R |
| 778861 | 7/1957 | United Kingdom | 24/20 CW |

*Primary Examiner*—Victor N. Sakran
*Attorney, Agent, or Firm*—Isler and Ornstein

[57] ABSTRACT

Hose clamps are disclosed comprising a band, band section, or attachment to a band, which yields in a direction circumferentially of the band and which possesses a spring-like quality and/or action such that the clamp is essentially self-adjusting to compensate for thermal expansion and contraction of the assembly (clamp, hose and fitting), as well as for the aging or cold set which the hose undergoes, whereby a fluid-tight seal is maintained throughout the intended life of the assembly, without requiring the clamp to be re-tightened. The bands of the clamps are open-ended and of generally circular configuration and are provided with a tangentially located or oriented worm drive screw for closing the clamp and providing a greater and closer range of adjustment in closing the clamp. The clamps, in some cases, have incorporated therein a positive stop, whereby closure of the clamp can be limited to a specified or predetermined size or diameter.

7 Claims, 17 Drawing Figures

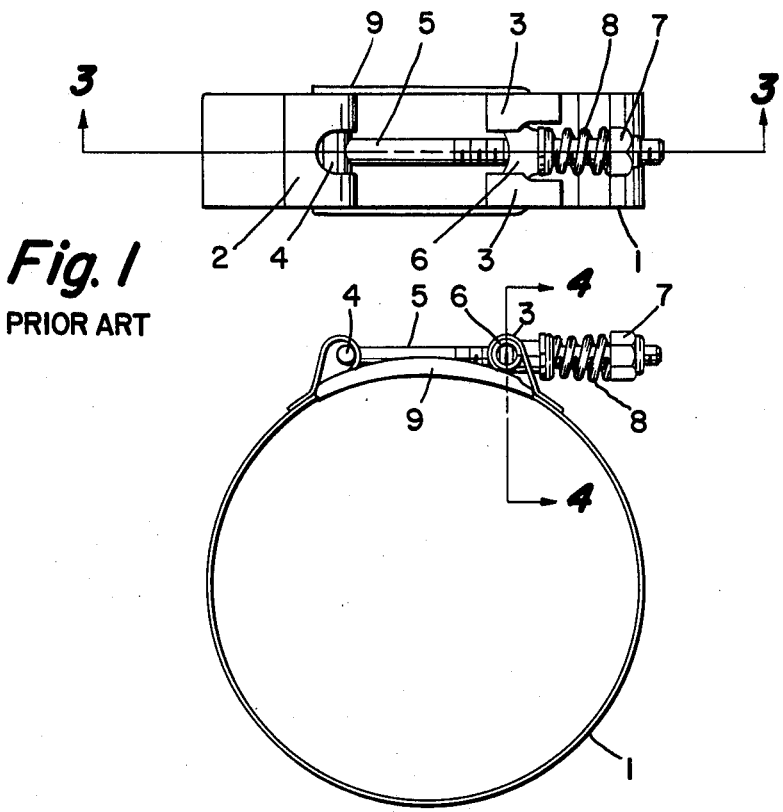
Fig. 1
PRIOR ART
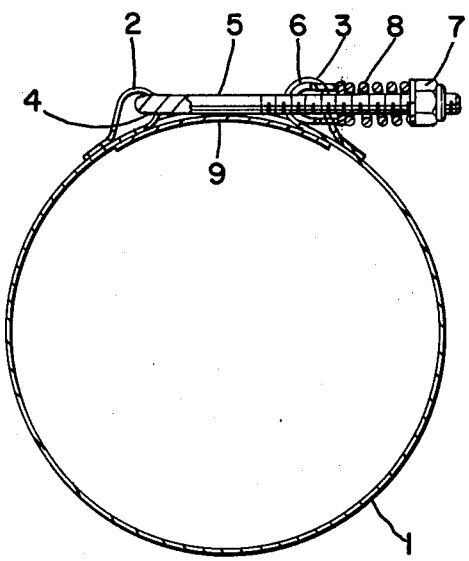
Fig. 2
PRIOR ART
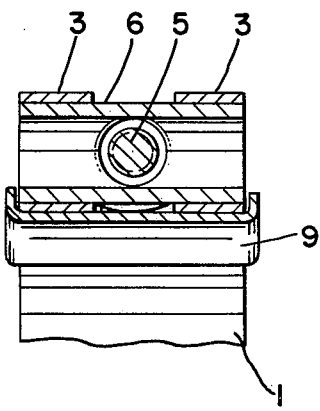
Fig. 3
PRIOR ART
Fig. 4
PRIOR ART

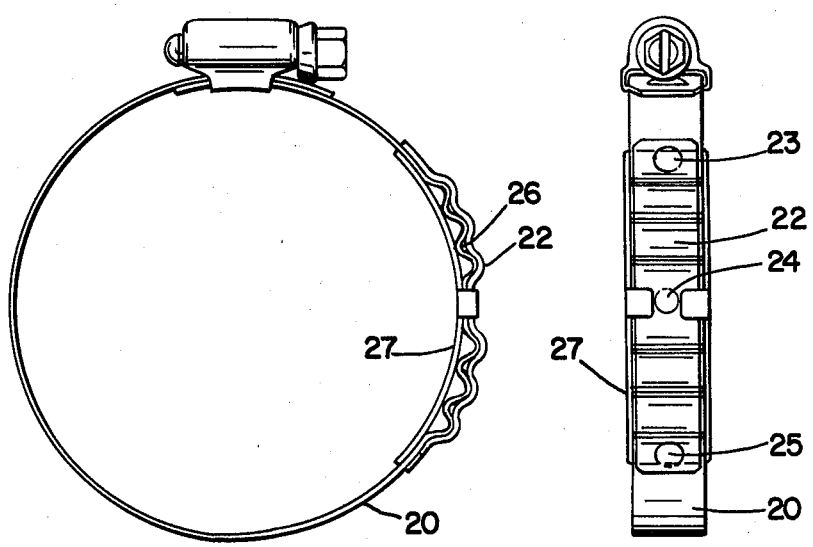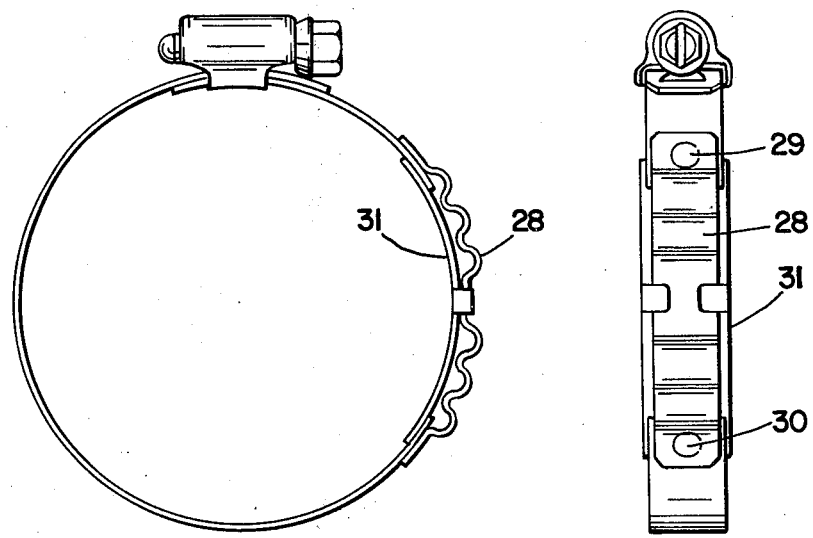

CONVOLUTED HOSE CLAMPS

BACKGROUND OF THE INVENTION

This invention relates as indicated, to hose clamps.

In Blair U.S. Pat. No. 1,705,895, a hose clamp is disclosed in which a transversely corrugated resilient area or section is provided, so that when the clamp is tensioned by means of a tool, such as a screw driver, it will yield slightly along this corrugated section, and the action of the corrugations will serve to contract the clamp so as to compensate for the shrinkage of the material in the hose, thereby maintaining a water-tight connection at all times.

The clamp of the aforesaid patent is provided at one end with spaced ratchet teeth and at the other end with spaced hooks, so that a screw driver or other tool may be used to place the clamp under tension and thereafter permit the hooks to engage the teeth.

In Heller U.S. Pat. No. 3,189,961, a hose clamp is disclosed, in which the clamp, formed of a resilient material, such as spring steel, is provided between its ends with bends or bent portions which supply spring tension to the clamp when the clamp is applied to a hose. One end of the clamp is provided with spaced slots or perforations and the other end of the clamp is provided with a tongue, so that after the ends are pulled in opposite directions until the required tension is reached, the tongue is caused to enter one of the slots or perforations and become locked therein.

In the Oetiker U.S. Pat. Nos. 3,475,793; 3,520,337 and 3,869,944, a spring tensioned band clamping device is disclosed, formed by a band and at least one tensional spring element made of a material having a high elastic limit so as to preserve the clamping pressure which might otherwise lessen due to aging, etc. The tensional spring elements may be in the form of undulated springs or may be in the form of ear-shaped folds. The ends of the hand are provided with a closing mechanism permitting a preliminary step-wise fitting of the band to the diametric dimensions of the hose or other object to be clamped. This closing mechanism consists, in one instance, of spaced perforations or apertures in one end of the band, and spaced counterhooks in the other end of the band, which engage with the apertures or perforations.

The hose clamps disclosed in the aforesaid Blair, Heller and Oetiker patents are representative of a type of clamp in which the clamp is applied primarily in a step-like manner, that is to say, in a ratcheting type action, one notch or step at a time until the appropriate "level" of tightness is achieved.

Such clamps, although they can be manufactured rather inexpensively, have numerous drawbacks or disadvantages which account for the fact that they are not generally popular in the industry which uses hose clamps.

One of the principal drawbacks or disadvantages is that the clamp tightens in a "step-like" manner, which action, in conjunction with the manufacturing variations in the hose, fitting and the clamp itself, will produce assemblies which will be at various degrees of tightness, and consequently at different levels of effective sealing.

Moreover, because of this step-like fastening design, it is necessary to use either some form of a special application tool or a standard tool which is manipulated through an arc-like movement, rendering it virtually impossible to use this type of clamp in a confined or restricted area.

Finally, this step-like arrangement must provide for some form of a notch and pawl to secure the ends of the band together, a provision which is likely to permit the ends of the band to become accidently disengaged from each other when the band is subjected to vibration and aging.

In another type of hose clamp, known as the "Voss" spring-loaded clamp, a heavy spring is used in conjunction with a nut and a "T" bolt to form an assembly.

A clamp of the "Voss" type has a limited operating range, and if the "T" bolt is made too long in an effort to obtain a greater range, the "T" bolt itself will become the chord of a segmented circle, making it impossible to obtain a circular clamp, and as a consequence, reducing the sealing efficiency of the clamp. Moreover, due to its many component pieces or parts, the clamp cannot be manufactured at low cost.

SUMMARY OF THE INVENTION

The invention has, as its primary object, the provision of substantial improvements in hose clamps of the type in which compensation is made for thermal expansion of the hose, the fitting and the clamp during the operation of an assembled connection, and in which compensation is made for the aging or cold set of the hose itself.

Another object of the invention is to provide a clamp of the character described, comprising a band, band section or attachment to a band, which will yield in a direction circumferentially of the band and which possesses a spring-like quality and/or action such that the clamp will be essentially self-adjusting and will compensate for and/or allow for the thermal expansion and contraction of the assembly, as well as for the aging or cold set which hose compounds undergo, whereby a fluid-tight seal is maintained throughout the intended life of the assembly, without requiring the clamp to be re-tightened.

A further object of the invention is to provide a hose clamp of the character described, having incorporated therein a positive stop, whereby closure of the clamp can be limited to a specified or predetermined size or diameter, so that the clamp can be manufactured for a specific application and when the clamp is tightened to a point where the stop is contacted by the band, the clamp will be at such degree of tightness as to assure proper sealing, and at the same time, allow for a visual inspection of the assembly rather than physically checking the torque of the drive screw which forms part of the clamp.

A still further object of the invention is to provide a hose clamp of the character described, which has incorporated therein a tangentially located or oriented drive screw for the purpose of closing the clamp and providing for a greater and closer range of adjustment in closing the clamp.

Other objects and advantages of the invention will become more apparent and the invention itself will be best understood by reference to the following description of several embodiments of the invention taken in conjunction with the accompanying drawings.

BRIEF DESCRIPTION OF THE DRAWINGS

FIG. 1 is a top plan view of a so-called "Voss" spring-loaded hose clamp, to which reference has been made hereinbefore as a type of clamp which is representative of "prior art";

FIG. 2 is a front elevational view of the clamp shown in FIG. 1;

FIG. 3 is a cross-sectional view taken on the line 3—3 of FIG. 1;

FIG. 4 is a fragmentary cross-sectional view on an enlarged scale, taken on the line 4—4 of FIG. 2;

FIG. 10 is a view similar to FIG. 6, but of a modification of the invention;

FIG. 11 is a side elevational view of the hose clamp of FIG. 10 as viewed from the right side of FIG. 10;

FIG. 12 is a view similar to FIG. 10, but of another modification of the invention;

FIG. 13 is a side elevational view of the hose clamp of FIG. 12 as viewed from the right side of FIG. 12;

DESCRIPTION OF THE PREFERRED EMBODIMENTS

Figure 5:
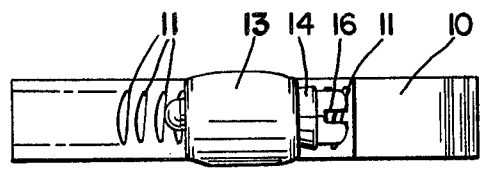
FIG. 5 is a top plan view of a hose clamp embodying the invention.

Referring more particularly to FIGS. 1, 2, 3 and 4 of the drawings, a so-called "Voss" spring-loaded hose clamp is shown, comprising a band 1 of spring-steel having a loop 2 at one end, and a loop 3 at the other end.

Secured for pivotal movement in the loop 2 is the head 4 of a "T" bolt 5. The stem of the bolt 5 extends diametrically through the loop 3 and through a sleeve 6 which is mounted for pivotal movement in the loop 3, the stem extending beyond the sleeve 6. The end of the stem of the bolt has a nut 7 secured thereto. A compression coil spring 8 is mounted on the stem of the bolt and is interposed between the end of the sleeve 6 and the nut 8. An arcuate shaped shield or guard 9 is slidably secured to the band 1 and extends between the loops 2 and 3, for the purpose of preventing intrusion of the hose into the space between the loops, when the clamp is tightened on the hose.

Expansion of the spring 8 serves to pull the loops 2 and 3 together, to thereby cause the band 1 to exert pressure on the hose.

Such a clamp has a rather limited operating range and if the bolt 5 is made too long in an effort to increase the range, the bolt itself becomes the chord of a segmented circle, making it impossible to obtain a circular clamp and as a consequence, reducing the sealing efficiency of the clamp. Moreover, the clamp due to its many components parts, cannot be manufactured and assembled at low cost.

Figures 6, 7:
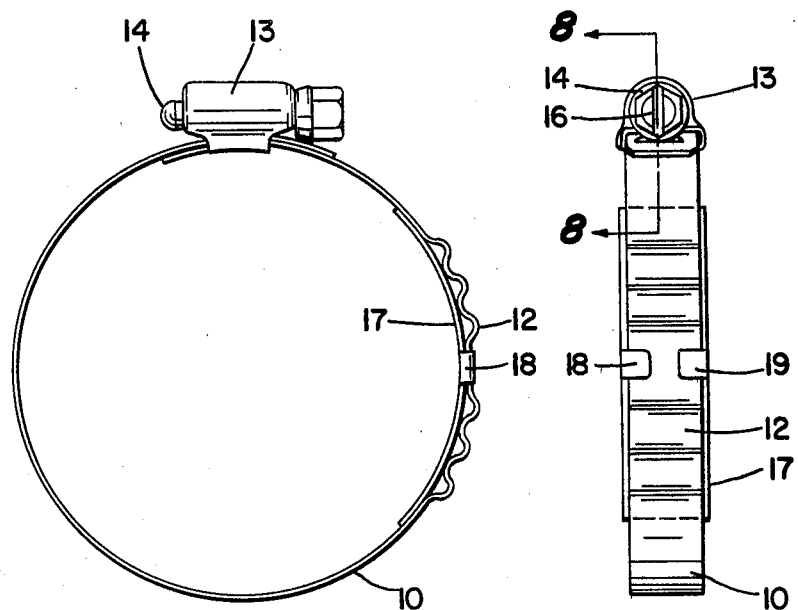
FIG. 6 is a front elevational view of the hose clamp shown in FIG. 5.
FIG. 7 is a side elevational view of the hose clamp shown in FIGS. 5 and 6, as viewed from the right side of FIG. 6.
Figures 8, 9:
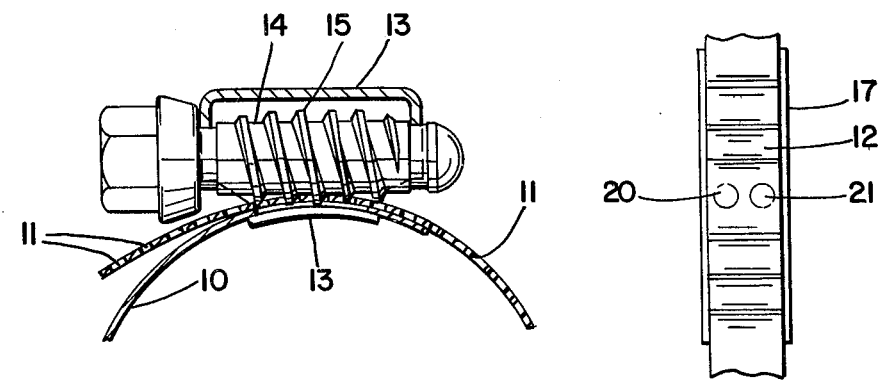
FIG. 8 is a fragmentary cross-sectional view on an enlarged scale taken on the line 8—8 of FIG. 7.
FIG. 9 is a fragmentary view similar to FIG. 7, but showing a slight modification.

Referring more particularly to FIGS. 5, 6, 7 and 8 of the drawings, a hose clamp is disclosed comprising an open-ended band 10 of generally circular configuration, and provided at one end with a series of uniformly spaced traverse slots 11.

The band 10 is provided with a corrugated or convoluted band section 12, which may be located at any desired position circumferentially of the band, except in the area in which the traverse slots 11 are located.

The band 10 is provided at its other end with a housing 13, which is spot-welded to the inner surface of that end of the band and in which a worm drive screw 14 is mounted for rotation about its axis, the screw having a spiral thread 15 which is engaged in the slots 11, and a slot 16 which is adapted to be engaged by a screw driver for the purpose of rotating the screw. The screw extends substantially tangentially of the band.

The band 10 is further provided with an inner shield 17 of arcuate configuration, which is designed to prevent the hose which is being clamped from flowing into the convolutions or corrugations of the band section 12.

The shield 17 is shown as loosely attached to the band by means of two folded tabs 18 and 19 which are integral with the shield, but the shield may be attached to the band by other common means, provided that the ends of the shield are not rigidly attached to the band 10, to thereby hamper expansion of the convoluted section 12. For example, the shield may be attached to the band, as by spot welding it to the band at the points 20 and 21 (see FIG. 9).

The shape and number of convolutions or corrugations in the section 12 may be varied, as required by the size of the clamp, the degree of elongation and the spring rate required for any application.

The band material used most commonly in hose clamps of this and similar construction has a very high tensile strength and does, in fact, approach a spring temper. This material quality is very important to the operation of this clamp for, as torque is applied to the drive screw 14 and the clamp is closed upon a hose and fitting or similar object, the corrugated or convoluted section 12 begins to yield circumferentially until the desired application torque is reached.

When the components of the assembly expand or contract due to temperature variations, or when the hose ages and shrinks. the corrugations will behave as a spring and allow the clamp to readjust in diameter, remaining sufficiently tight enough to seal. The spring rate of the corrugations is therefore a function of the materials physical properties and the configuration of the convolutions.

A hose clamp, as thus described, has numerous improvements and/or advantages over the prior art among which the following may be mentioned:

(a) The use of a worm drive screw in such a clamp provides for a smooth and continuous means of tightening the clamp and thereby assuring that all hose clamp assemblies can be tightened to any necessary degree.

(b) The use of a worm drive screw in such a clamp permits torque to be the indicator of how tight an assembly is rather than what position or step is used.

(c) The use of a worm drive screw in such a clamp provides a much easier means of tightening the clamp, due to the innate mechanical advantage of the screw.

(d) The use of a worm drive screw in such a clamp, along with its associated housing, positively contains and prevents the band from becoming prematurely or accidentally disengaged or released.

(e) The use of a worm drive screw in such a clamp permits standard hand tools, such as a screw driver to be used in installing the clamp, instead of specialized tools, as in the case of most step-like concepts, as hereinbefore described.

(f) The use of a worm drive screw in such a clamp allows the clamp to be used in highly confined or restricted areas, since the only motion or movement required to tighten the clamp is the rotation of the screw by the use of a screw driver or socket and extension, if necessary.

(g) The use of a worm drive screw in such a clamp allows SAE J536 b specifications to be used as an indicator or guideline as to the strength and/or quality of the clamp being used.

(h) The use of a worm drive screw in such a clamp allows for the clamp to have a much greater diameter range than those clamps which have a "T" bolt and spring incorporated therein, since the band may have as many traverse slots therein as required, as long as the slotted section does not extend into the convoluted (yielding) section of the band.

In FIGS. 10 and 11, a modification is illustrated, which is similar in all respects to the clamp shown in FIGS. 5, 6, 7 and 8, but which includes a secondary convoluted or corrugated member 22 which is attached as by spot welds at points 23, 24 and 25 to the exterior of the convoluted or corrugated area or section 26, of the band.

The secondary member 22 is so designed that its corrugations or convolutions nest within the corrugations or convolutions of the convoluted or corrugated area or section 26 of the band 20.

The material used for the secondary member 22 is preferably of a high spring temper, since its sole function is to add to the spring rate of the convolutions of the area or section 26 of the band.

The clamp of this modification is provided with an inner shield 27 similar to the shield 17 and attached to the band 20, in the same manner that the shield 17 is attached to the band 10.

The clamp of this modification lends itself to applications or uses requiring a very high spring rate and application torque.

In FIGS. 12 and 13, another modification is shown, which is similar to the clamp shown in FIGS. 5, 6, 7 and 8 with the exception that the corrugated or convoluted band section 12 of that clamp has been eliminated, and, in lieu thereof, a separate convoluted or corrugated member 28 is provided which extends across the gap left by the eliminated band section, and is secured to the band, as by spot welding it to the band at the points 29 and 30, or by other means.

The clamp of this modification is provided with an inner shield 31, similar to the shields 17 and 27, and which is attached to the member 28 in the same manner that the shields 17 and 27 are attached to the bands of those hose clamps.

The hose clamp of FIGS. 12 and 13 is designed to permit ease of assembly, and to allow for tailoring of the spring rate to suit the application for which the clamp is intended.

Figure 14:
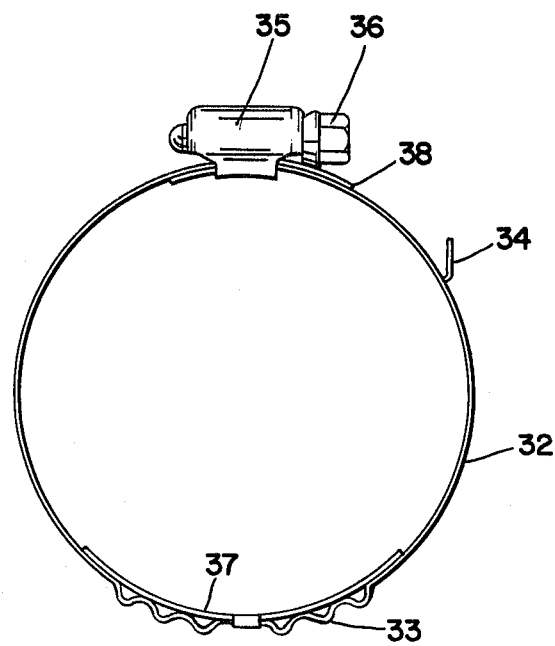
FIG. 14 is a view similar to FIG. 6, but of a modification embodying a positive closure stop.
Figure 16:
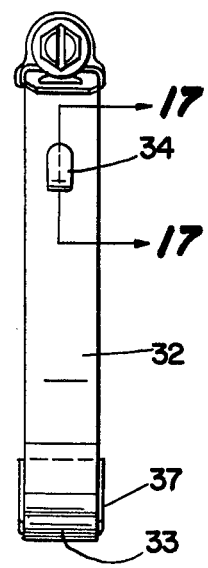
FIG. 16 is a side elevational view of the hose clamp of FIG. 14 as viewed from the right side of FIG. 14.
Figure 15:
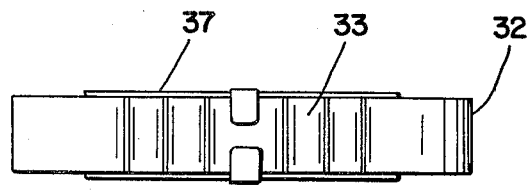
FIG. 15 is a bottom plan view of the hose clamp of FIG. 14.
Figure 17:
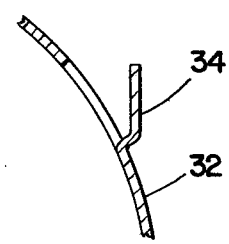
FIG. 17 is a fragmentary cross-sectional view on an enlarged scale taken on the line 17—17 of FIG. 16.

In FIGS. 14, 15, 16 and 17, a further modification is shown which is similar in function and construction to those hereinbefore described, with the exception that the convoluted or corrugated section and inner shield 33 have been relocated to permit the inclusion of a positive closure stop.

In this modification, the clamp comprises an open-ended band 32 of generally circular configuration, and provided at one end with a series of uniformly spaced traverse slots similar to the slots 11.

The band 32 is provided with a corrugated or convoluted band section 33, similar to that shown in FIGS. 5, 6, 7 and 8, but relocated to a position other than that shown in FIGS. 5, 6, 7 and 8, so that the band may be provided with a positive closure stop 34, the function of which will be presently explained.

The closure stop 34 is formed by lancing the metal of the band and bending the lanced area outwardly so that it extends substantially tangential to the band. This closure stop may also be provided as a separate element attached to the band.

The band 32 is provided at its other end with a housing 35, which is spot-welded to the inner surface of that end of the band, and in which a worm drive screw 36 is mounted for rotation about its axis, the screw having a spiral thread which is engaged in the slots and a slot in its head which is adapted to be engaged by a screw driver for the purpose of rotating the screw.

The band 32 is also provided with an inner shield 37 of arcuate configuration, similar to the shield 17, and attached to the band in the same manner as the shield 17.

In applying the hose clamp of FIGS. 14, 15, 16 and 17 to a hose, the drive screw 36 is rotated to draw the slotted end of the band 32 through the housing 35, thereby causing the diameter of the band to become smaller as the end 38 of the slotted portion moves toward the closure stop 34.

Before the end 38 comes into contact with the stop 34, the hose clamp must close upon the hose which is to be sealed, and at this point, the corrugated or convoluted section 33 will begin to yield as the clamp is closed further, and at the point where the band end 38 comes into contact with the stop, the convoluted section will be creating sufficient tension to provide a fluid-tight seal between the hose and the clamp. This allows for the application of clamps independent of input torque on the screw 36, by providing for a physical and visual means of determining correct band tension.

On assembly lines where pneumatic torque wrenches are commonly used, such a clamp will provide for more uniform applications. When the band end 38 comes into contact with the closure stop 34, the torque wrench will sense a sudden increase in the turning resistance of the drive screw and automatically shut off, at which point, the convoluted section has elongated sufficiently to create the required band tension for proper sealing.

The positive closure stop which has been described above in connection with FIGS. 14, 15, 16 and 17, may also be incorporated in the modifications shown in FIGS. 10 and 12.

Since there will be variations in the components that form the assembly, namely, the hose, the fitting and the clamp itself, it will be necessary to size the clamp such that it will function as described on the smallest possible combination. In this way, proper sealing will be assured with any combination of components, regardless of how the tolerances accumulate.

Having thus described my invention, I claim:

1. In a hose clamp of the character adapted for use in an assembly comprising a clamp, hose and fitting, the combination comprising: an open ended band of generally circular configuration, the ends of which overlap each other to vary the diameter of the band, means associated with said band which is yieldable in a direction circumferentially of the band and is displaced circumferentially from the area of said overlap, and which has a spring-like quality or action such that the band is self-adjusting to compensate for or allow for thermal expansion and contraction of the assembly as well as for the aging of the hose, to thereby maintain a fluid tight seal between the hose and fitting, said means consisting of circumferentially spaced corrugations or convolutions, and means for varying the diameter of said band, said last-named means comprising a series of circumferentially-spaced traverse slots in one end of said band, and a worm drive screw mounted for rotation in the other end of said band and in engagement with said slots, said screw having its axis extending substantially tangential to said band.

2. A hose clamp as defined in claim 1, wherein said first-named means is an integral part of said band.

3. A hose clamp as defined in claim 1, wherein said first-named means comprises a member attached to said band.

4. A hose clamp as defined in claim 1, wherein said band has incorporated therein a positive stop for limiting closure of the clamp to a predetermined diameter, whereby said closure provides a visual means of inspection for correct application of said clamp.

5. A hose clamp as defined in claim 4, wherein said stop is struck from the material of said band and is adapted to be engaged by one end of the band.

6. In a hose clamp of the character adapted for use in an assembly comprising a clamp, hose and fitting, an open-ended band of generally circular configuration, the ends of which overlap each other to vary the diameter of the band, means associated with said band which is yieldable in a direction circumferentially of the band and is displaced circumferentially from the area of said overlap, and has a spring-like quality or action such that the band is self-adjusting to compensate for or allow for thermal expansion and contraction of the assembly as well as for the aging of the hose, to thereby maintain a fluid tight seal between the hose and fitting, and means for varying the diameter of said band, said last-named means comprising a series of circumferentially-spaced traverse slots in one end of said band, and a worm drive screw mounted for rotation in the other end of said band and in engagement with said slots, said screw having its axis extending substantially tangential to said band, and a secondary member attached to said band and having a spring-like quality similar to that of said first-named means, whereby to increase the spring rate of said first-named means.

7. A hose clamp as defined in claim 5, wherein said secondary member consists of circumferentially-spaced corrugations or convolutions.

* * * * *